Aug. 11, 1959 — E. W. BRAINARD — 2,899,148
WINDING DEVICE FOR FISHING REELS
Filed Dec. 3, 1956
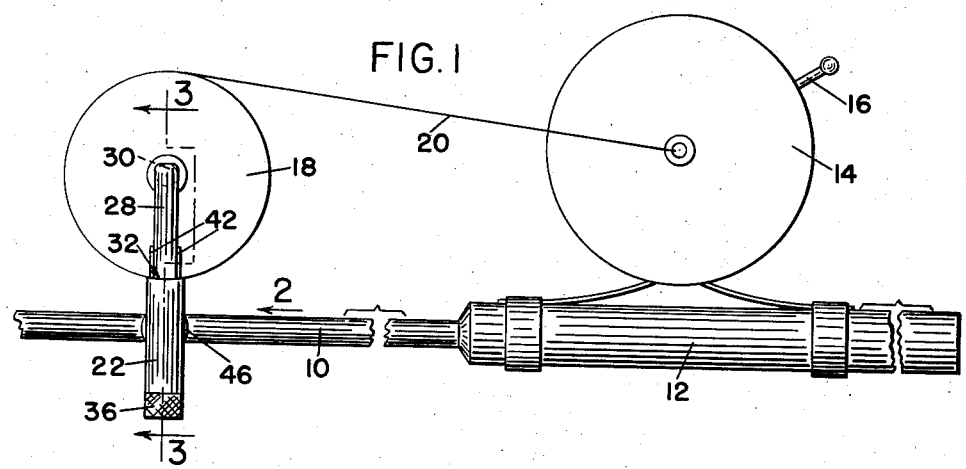
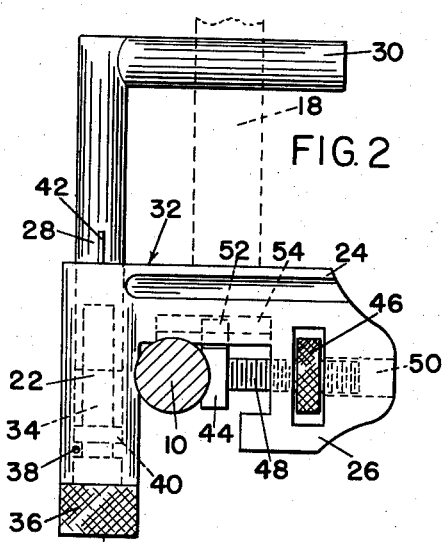
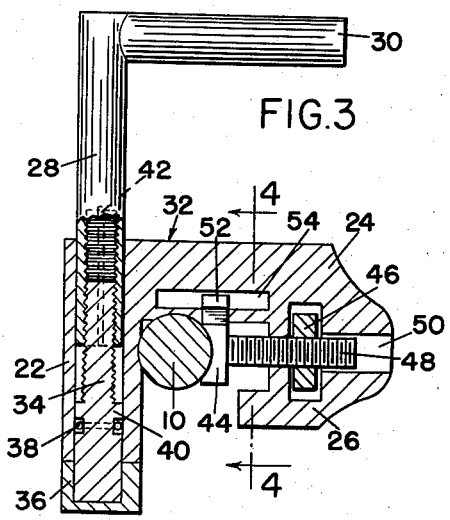
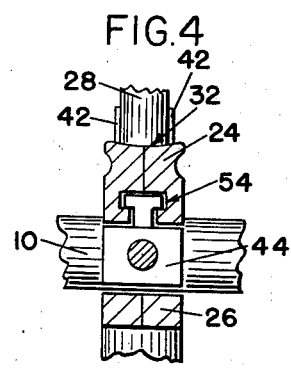
INVENTOR
EDWIN WARREN BRAINARD
ATTORNEY United States Patent Office 2,899,148
Patented Aug. 11, 1959

2,899,148
WINDING DEVICE FOR FISHING REELS
Edwin Warren Brainard, Westminster, Mass.
Application December 3, 1956, Serial No. 625,678
1 Claim. (Cl. 242—129.8)

This invention relates to a new and improved winding device particularly adapted for detachably mounting on a fishing-rod and including means holding a spool of fishing line, together with means for imparting friction to the spool, whereby the line may be wound upon the reel with a correct desired tension applied to the spool so as to prevent the kinking, uncoiling, and loss of the fishing-line.

Particularly in cases where mono-filament lines are used with spinning reels, it often happens that when line is being wound onto the reel, tension is lost and the line immediately kinks, snarls and becomes so entangled that it must be cut off and thrown away, and the present invention provides a new and improved device of a very simple, inexpensive nature completely avoiding the loss of line or the kinking thereof in any way, and at the same time dispensing with the usual necessity for two persons applying a new line to a reel, so that the fisherman may apply the line to the reel by himself with the use of the present device.

Other objects and advantages of the invention will appear hereinafter.

Reference is to be had to the accompanying drawings, in which

Fig. 1 is a view in side elevation illustrating the device applied to a rod, parts being broken away;
Fig. 2 is a view in elevation of the device itself, looking in the direction of arrow 2 in Fig. 1;
Fig. 3 is a section on line 3—3 of Fig. 1; and
Fig. 4 is a section on line 4—4 of Fig. 3.

When lines are to be applied to fishing reels, it is commonly the practice for one person to place a pencil through the hub of the spool upon which the line is wound and to apply tension thereto by means of the thumb while the other person applies the leading end of the line to his reel and cranks the reel so as to wind the line thereon. As is well known, this is a cumbersome, unhandy, and in general a poor way of applying fishing-line to a reel because it depends upon the one holding the new spool of line maintaining an even pressure by means of his fingers on the spool, and very often this person will allow the tension to become relaxed, whereupon the line usually forms itself into a snarled-up mass which cannot be untangled and which has to be thrown away.

In the present case, there is shown a rod 10 having a handle 12 upon which is mounted a reel 14 having a handle 16 upon rotation of which the line is reeled into a spool in the reel, not shown but well known in the art. A closed spool reel is shown here but any kind of reel may be utilized in the present invention.

The reference numeral 18 illustrates a spool upon which line 20 is wound, it being of course understood that the line is purchased in this condition. There may be 100, 200 or more yards of such line on the spool 18 and the problem is to transfer this line from the spool 18 to the reel 14.

The present invention comprises a light-weight housing including a hollow cylindrical portion 22 having integral therewith a bridge portion 24 and a clamping portion 26. In general, this device would comprise a pair of parts molded separately and cemented together and preferably the same may be made of commercial plastic, aluminum, white metal, etc.

The cylindrical portion 22 is hollow and receives a leg 28 of a spool-holding spindle 30. The leg 28 is adjustable with relation to the surface 32 of the bridge portion 24 by any desired means as for instance a screw 34 which is engaged with screw-threads inside the leg 28. The screw 34 may be provided with a finger-knob 36 by which it is rotated and this assembly of parts may be held together by any desired means such as a pin 38 passed through a collar 40 on the screw. Also, fins 42 may be applied to the leg 28 for the purpose of preventing rotation of the leg within the cylindrical portion 22 of the device.

By placing the spool 18 on the spindle 30, and then turning the member 36, the periphery of the spool may be lightly engaged with the surface 32 of the bridge portion 24 of the device to the extent demanded by the tension required upon line 20. This tension may be seen to be easily variable between very light and heavy at the will of the operator.

In order to mount the device upon the rod 10, there is provided a clamping member 44 which may be advanced or retracted by means of a thumb-nut or the like 46 actuating a screw 48 located at an opening 50 in the portion 24 of the device. This screw advances or retracts the clamping member 44 as the nut 46 is rotated.

The clamping member 44 may be provided with a guide member 52 best shown in Fig. 4 and riding in undercut grooves 54 in the bridge member 24. Thus as the clamping member 44 is advanced to the left in Figs. 2 and 3, the rod 10 is grasped thereby and the device is thus easily and quickly mounted upon the rod in advance of the reel so as to quickly, easily, and safely wind the line on the reel. When the line has been completely wound on the reel, the device embodying the present invention is easily removed from the rod, and replaced in the tackle-box.

It will be seen that this invention provides a relatively simple and inexpensive device of the class described which may be used as desired for the purpose indicated, thus resulting in a great convenience to the fisherman as well as a saving of line which as above described often becomes lost during the winding of the line on the fishing reel.

Having thus described my invention and the advantages thereof, I do not wish to be limited to the details herein disclosed, otherwise than as set forth in the claim, but what I claim is:

A device for holding a wound spool of fishing-line to a fishing rod having a reel for transfer of the line to the reel, said device comprising a body including a cylinder, a leg in the cylinder, means to move the leg axially in the cylinder, a spindle on the leg, a friction surface on the body adjacent the cylinder, said spindle and surface being parallel and the spindle moving toward and away from the surface as the leg is moved, a clamp member, on the body, and means to move the clamp member at right angles to the cylinder and parallel to the spindle to clamp the rod to the cylinder and at right angles to the spindle.

References Cited in the file of this patent

UNITED STATES PATENTS

| | | |
|---|---|---|
| 335,826 | Martin | Feb. 9, 1886 |
| 2,057,728 | Lester | Oct. 20, 1936 |
| 2,147,351 | Ram | Feb. 14, 1939 |
| 2,596,766 | Dugdale | May 13, 1952 |

FOREIGN PATENTS

| | | |
|---|---|---|
| 303,746 | Switzerland | Feb. 16, 1955 |